US006966780B2

(12) United States Patent
Perry

(10) Patent No.: US 6,966,780 B2
(45) Date of Patent: Nov. 22, 2005

(54) METHOD AND APPARATUS FOR CREATING A LESSON PLAN COMPLYING WITH ACADEMIC STANDARDS

(75) Inventor: Cassandra D. Perry, Fort Wayne, IN (US)

(73) Assignee: Yes, !nc., Fort Wayne, IN (US)

(*) Notice: Subject to any disclaimer, the term of this patent is extended or adjusted under 35 U.S.C. 154(b) by 5 days.

(21) Appl. No.: 10/404,454

(22) Filed: Apr. 1, 2003

(65) Prior Publication Data

US 2003/0184080 A1 Oct. 2, 2003

Related U.S. Application Data

(60) Provisional application No. 60/369,061, filed on Apr. 1, 2002.

(51) Int. Cl.[7] .................................................. G09B 3/00

(52) U.S. Cl. ........................................................ 434/322

(58) Field of Search ................................ 434/107, 108, 434/109, 219, 156, 322, 365, 367; 281/16; 283/2, 4, 46, 115

(56) References Cited

U.S. PATENT DOCUMENTS

| | | | | |
|---|---|---|---|---|
| 3,221,751 | A | 12/1965 | Brandon | 129/34 |
| 4,137,650 | A * | 2/1979 | Hayes | 434/429 |
| 4,175,340 | A * | 11/1979 | Deutch | 281/16 |
| 4,932,679 | A | 6/1990 | Mayer et al. | 281/18 |
| 5,002,491 | A * | 3/1991 | Abrahamson et al. | 434/322 |
| 5,240,340 | A | 8/1993 | Lynch et al. | 402/79 |
| 5,407,231 | A | 4/1995 | Schwartz | 281/16 |
| 5,730,604 | A * | 3/1998 | Jay et al. | 434/365 |
| 5,975,580 | A | 11/1999 | Insalaco | 283/67 |
| 6,039,355 | A | 3/2000 | Durand | 283/2 |
| 6,116,652 | A | 9/2000 | Page | 283/45 |
| 6,135,662 | A | 10/2000 | Bakke et al. | 402/73 |
| 6,146,148 | A * | 11/2000 | Stuppy | 434/322 |
| 6,270,351 | B1 * | 8/2001 | Roper | 434/118 |
| 6,364,362 | B1 * | 4/2002 | Severin | 283/17 |
| 6,540,521 | B1 * | 4/2003 | Crilly | 434/365 |
| 6,561,812 | B1 * | 5/2003 | Burmester et al. | 434/365 |

* cited by examiner

*Primary Examiner*—Kurt Fernstrom
(74) *Attorney, Agent, or Firm*—Baker & Daniels LLP

(57) ABSTRACT

An academic planner having selectively integrated state academic standards. The academic planner is structured and arranged to allow for concurrent viewing of integrated state academic standards while viewing and/or recording information in the academic planner.

6 Claims, 5 Drawing Sheets

METHOD AND APPARATUS FOR CREATING A LESSON PLAN COMPLYING WITH ACADEMIC STANDARDS

CROSS-REFERENCE TO RELATED APPLICATION

This application is related to and claims the benefit under 35 U.S.C. §119 (e) of U.S. Provisional Patent Application Ser. No. 60/369,061, filed Apr. 1, 2002.

BACKGROUND OF THE INVENTION

1. Field of the Invention

The present invention relates to a method and apparatus for recording information in a primary medium while viewing information in at least one secondary medium selectively integral with the primary medium. More particularly, the present invention relates to a method and apparatus for allowing educators to record lesson plans in an academic planner while viewing state academic standards recorded on secondary media selectively integral with the planner.

2. Description of the Related Art

Many states have passed laws that have had a profound impact on how schools demonstrate accountability for their students' learning. By requiring the academic testing of students to ascertain whether the students' schools are preparing them to a state-mandated level of academic proficiency, these laws allow states to hold schools accountable for the academic achievement of their students. As a consequence, educators within these schools are also now held to a higher standard of performance and success than that which they have been held to in the past. In fact, an educator can lose his/her position if the educator's school is found not to have adequately prepared its students academically.

Some states require educators to ensure that their students are proficient in as many as eight different academic standards (the "academic standards" or "standards"), including, but not limited to: English, mathematics, science, fine arts, foreign language, physical education, social studies, and health. State boards of education adopt these academic standards and require that state schools teach their students in accordance with the standards. In order for educators to teach their students in accordance with the standards and to prepare them to meet the proficiency levels which the standards require, it is absolutely necessary for the educators to incorporate the standards into their lesson plans. Before educators can incorporate the standards into their lesson plans, the standards must be accessible to educators as they are preparing their lesson plans. Accessibility and academic standards, however, do not always go hand in hand, and the burden on educators to constantly locate the standards places educators at a disadvantage.

While different state laws now require educators to educate their students to the level of proficiency mandated in their respective academic standards, educators often have a hard time locating these standards for incorporation into their lesson plans. It is not always easy for an educator to obtain copies of academic standards which each state supplies to its multiple school systems. Often times, the standards are located at the schools' central office, library or on the internet. Principals may distribute the academic standards to all the educators, but the educator may not have their needed standards conveniently accessible. For all of these reasons, academic standards can be difficult to locate.

Once an educator originally locates the appropriate academic standards, the educator faces the problem of keeping track of the standard pertinent to the lesson plan the educator wishes to create. Many educators teach multiple subjects during the course of a day, and teaching multiple subjects means preparing lesson plans which conform to multiple academic standards. These educators find it difficult to keep track of all the academic standards which are necessary to create a lesson plan meeting their state's proficiency requirements. For example, an educator might teach math, science, English, and social studies every day. In order to prepare the appropriate lesson plan, the educator needs to access four academic standards, i.e., a standard for each subject. On any given day, however, the math academic standard might be in the educator's brief case, the English academic standard might be in the educator's car, the science academic standard might be in the educator's home, and the social studies academic standard might be located somewhere on the educator's desk. For an educator in this situation, it is very difficult to create lesson plans for each subject taught including the necessary standards. Numerous educators must also travel from classroom to classroom. It is cumbersome for these educators to gather multiple standards daily and carry them from classroom to classroom all day long.

What is needed in the art is an academic planner having selectively integrated state academic standards, wherein the academic standards are structured and arranged for concurrently viewing the academic standards while viewing and/or recording information in the academic planner to provide educators with all necessary tools for customizing and accessing state standards and successfully aligning daily lesson plans to said standards.

SUMMARY OF THE INVENTION

The present invention is an academic planner having selectively integrated state academic standards, wherein the academic standards are structured and arranged to allow for concurrent viewing of the academic standards while viewing and/or recording information in the academic planner.

For purposes of this document, the use of the phrase "primary medium" includes, but is not limited to, a physical structure or electronic device capable of recording and displaying information. The use of the phrase "secondary medium" includes, but is not limited to, a physical structure or electronic device capable of recording and displaying information which can be referenced while a user utilizes the primary medium.

The present invention provides numerous advantages. The capability of the academic standards to be selectively attached to the planner eliminates the problem of not being able to locate the standards for reference when creating a lesson plan, as the standards are integral with the academic planner. This capability also eliminates the problem of keeping track of a standard once the standards are located. The standards are selectively attachable to the planner to allow the user of the present invention to attach to the planner the standards which are relevant to the lesson plans the user is creating. For example, an educator who teaches math and science can attach the math and science academic standards to his/her planner. Another educator who only teaches social studies can attach the social studies academic standard to his/her academic planner. By being selectively attachable to the planner, the standards do not need to be located every time that they need to be referenced. The standards simply need to be attached to the planner.

The present invention is advantageous in that numerous pages of academic standards attached to the academic planner may be viewed together with pages of the academic planner. With this in mind, a user of the present invention may, advantageously, view printed academic standards while creating a lesson plan.

By negating the problems of locating the standards every time they need to be accessed and keeping track of the standards once they are located, and by allowing the standards to be viewed while concurrently recording information in the academic planner, the present invention allows an educator to easily incorporate pertinent academic standards directly into his/her lesson plan.

The present invention provides an integrated planner with academic standards selectively attachable thereto. Accordingly, the present invention facilitates the concurrent use of both the planner and the academic standards to easily allow an educator to incorporate the appropriate standards into his/her lesson plans. In this way, educators can be better equipped to educate their students to the level of proficiency which they and their schools are now held accountable.

The invention, in one form thereof, comprises an academic planner including a planner body and a plurality of planner pages attached to the planner body. The academic planner of this form of the present invention further includes an academic standard booklet containing a plurality of pages of state academic standards for a particular grade and subject. The academic standard booklet is selectively attachable to the planner body with the pages of state academic standards of the academic standard booklet viewable together with at least one of the plurality of planner pages when the academic standard booklet is attached to the planner body.

In one form of the present invention, each planner page includes at least one partitioned area for recording a lesson plan, with each partitioned area including a designated position for recording identifying information for tying the lesson plan to a chosen academic standard.

The invention, in another form thereof, comprises a method of facilitating an instructor's compliance with state academic standards, comprising: providing an academic planner including a planner body and a plurality of planner pages attached to the planner body; providing a plurality of academic standard booklets, each containing a plurality of pages of state academic standards for a particular grade and subject, the academic standard booklets selectively attachable to the planner body, the pages of state academic standards viewable together with at least one of the plurality of planner pages when the academic standard booklet is attached to the planner body; choosing at least one of the academic standard booklets; attaching the chosen academic standard booklet to the planner body; and viewing the academic standard booklet while recording a lesson plan in a planner page.

The invention, in another form thereof, comprises a method of preparing a lesson plan. The method of this form of the present invention includes the steps of: providing an academic planner, the academic planner including a primary medium for recording and displaying an amount of primary information, and at least one secondary medium for displaying an amount of secondary information, the secondary medium selectively attachable to the primary medium whereby the amount of secondary information is concurrently viewable together with the primary medium when the secondary medium is attached to the primary medium; attaching the secondary medium to the primary medium recording a lesson plan in the primary medium while concurrently referencing the amount of secondary information contained in the secondary medium, the lesson plan comprising the amount of primary information.

The present invention advantageously allows an instructor to easily incorporate academic standards relevant to the curriculum being taught by the instructor into a lesson plan.

The present invention further advantageously allows for concurrent viewing of academic standards while recording a lesson plan and facilitates tying lesson plans to state academic standards.

Other objects of the invention will become apparent upon consideration of the following written description and accompanying figures.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

Figure 1:
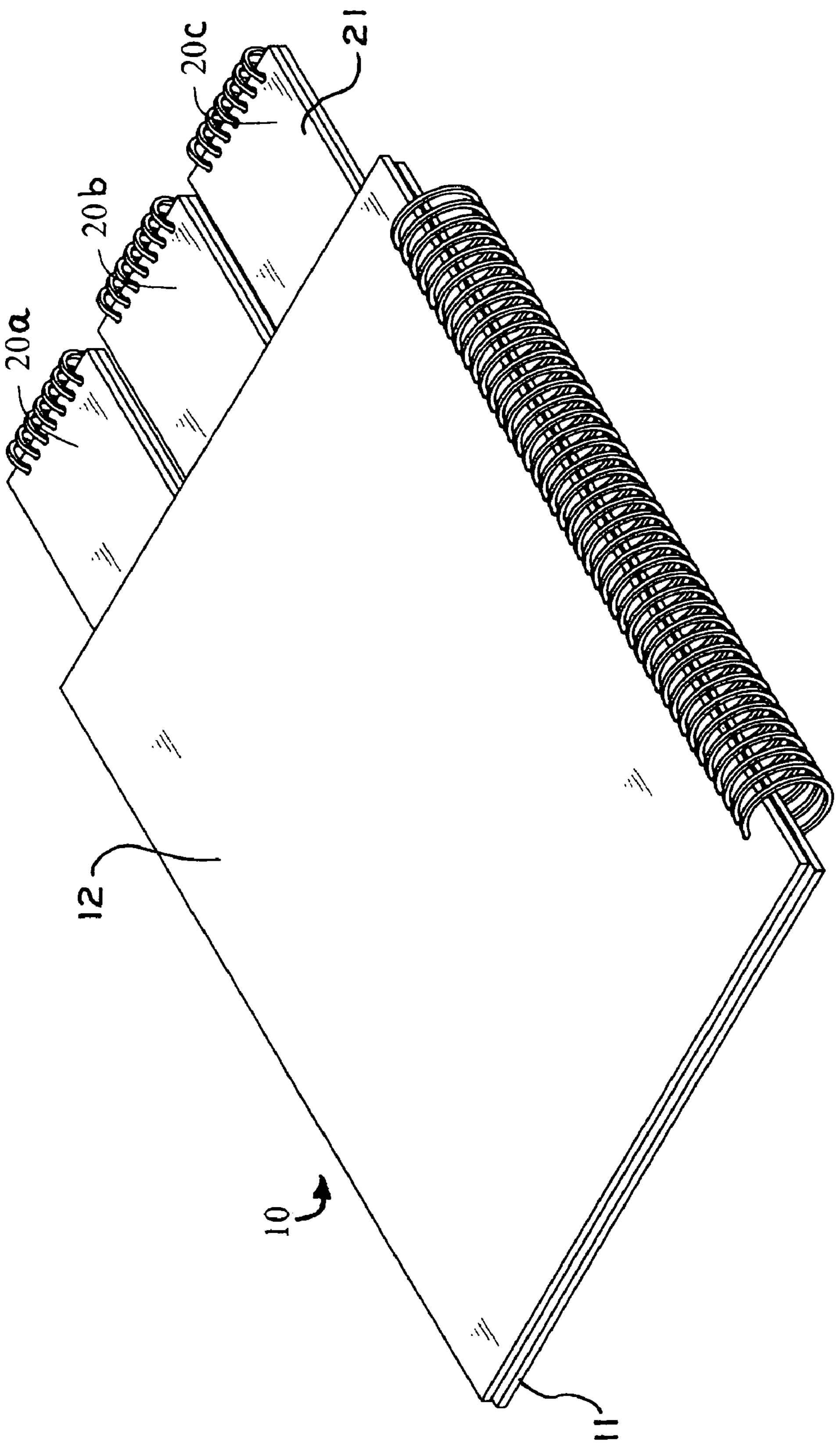
FIG. 1 is a perspective view of a closed academic planner of the present invention having secondary media containing academic standards attached thereto.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE INVENTION

Figure 2:
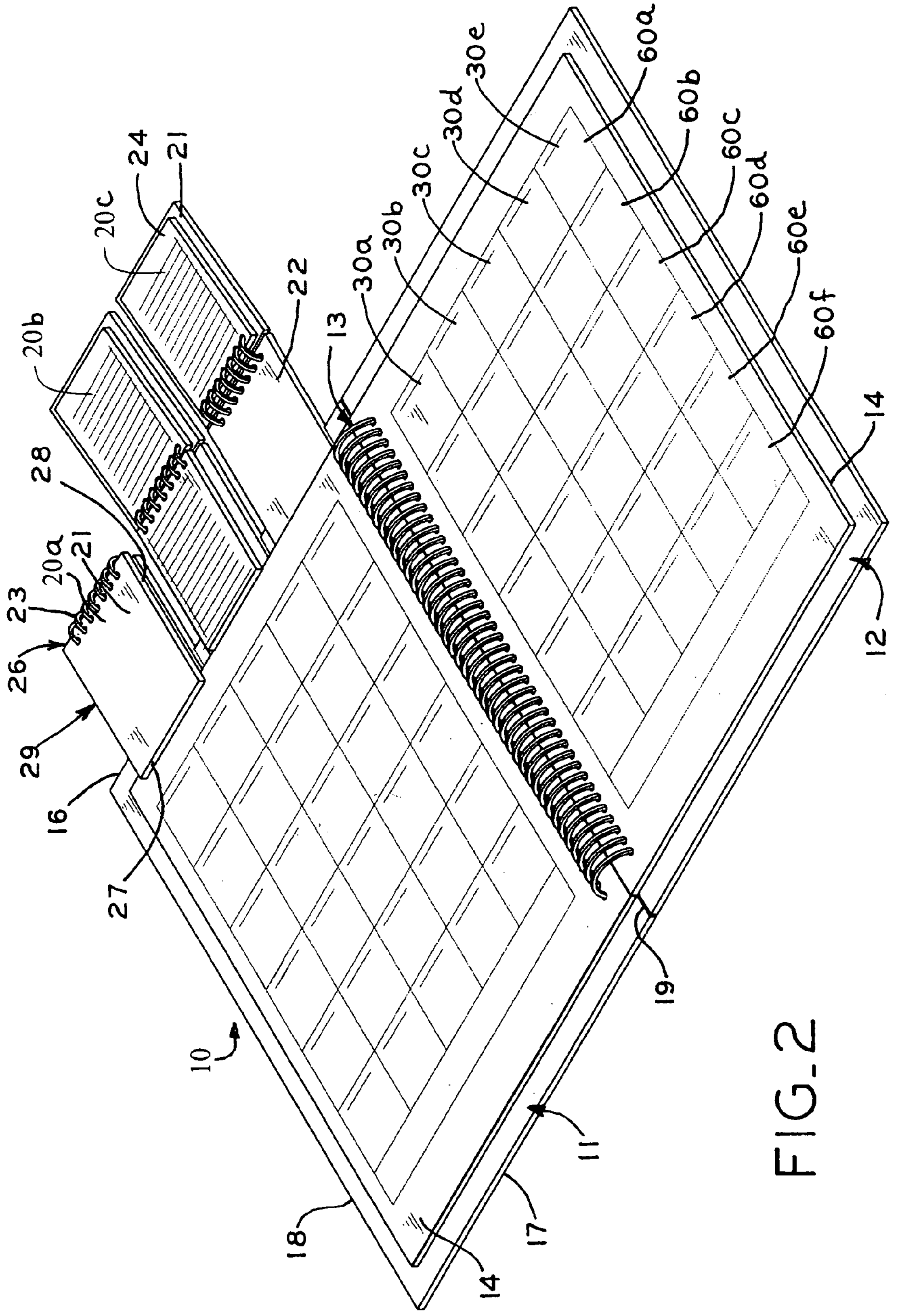
FIG. 2 is a perspective view of the academic planner of FIG. 1 in an open configuration.
Figure 3:
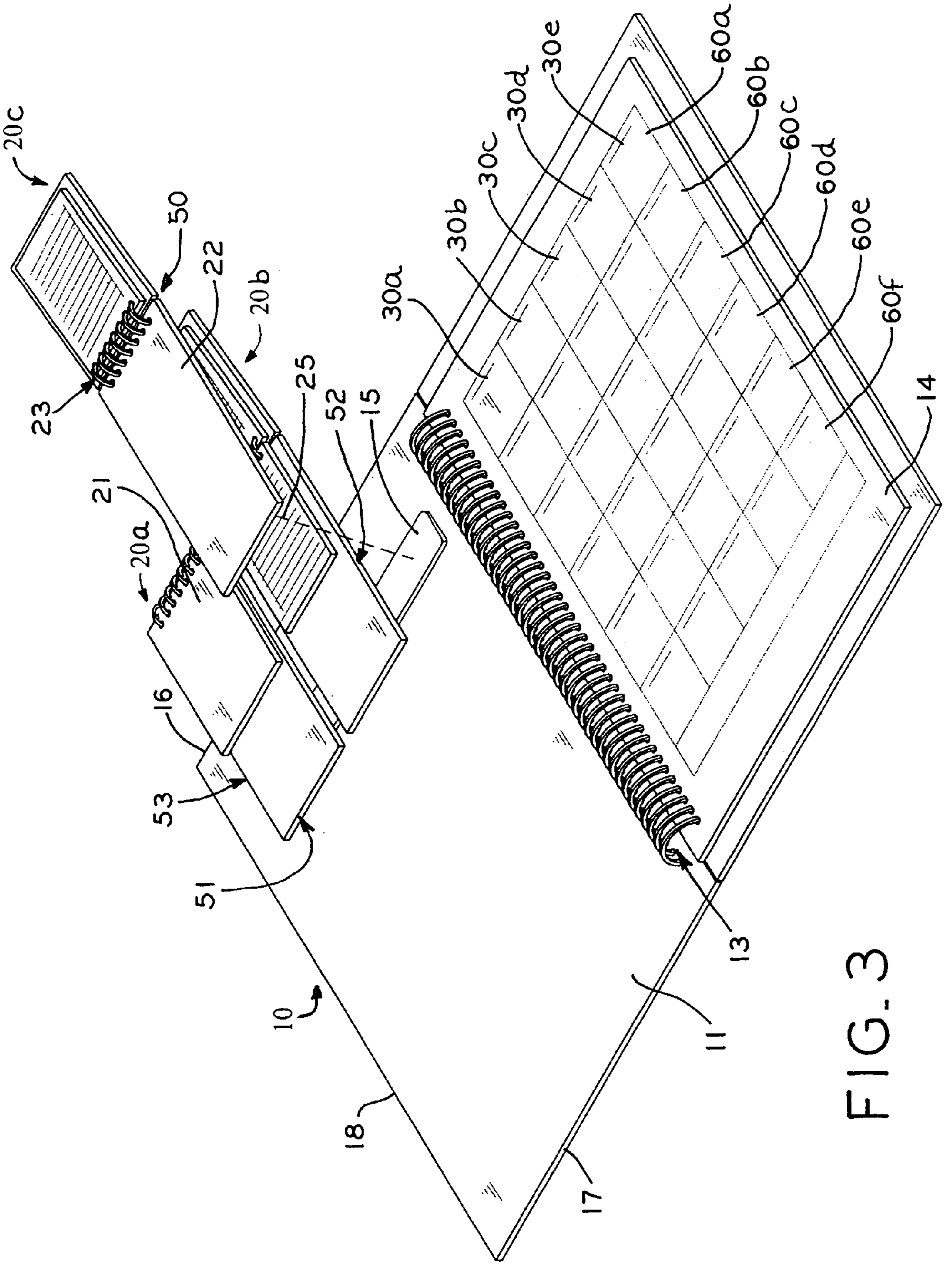
FIG. 3 is an exploded perspective view thereof.

Referring now to FIG. 1, planner 10 includes academic standards **20*a*, 20*b*, 20*c* selectively attached thereto. FIG. 3 illustrates attachment of standard 20*c*. Both planner 10 and standards 20*a*, 20*b*, 20*c* are closed in FIG. 1. Referring to FIG. 2, planner 10 includes planner pages 14 positioned intermediate planner cover 11 and planner backing 12. The perimeter of planner cover 11, defined by planner cover top edge 16, planner cover bottom edge 17, planner cover right edge 18 and planner cover left edge 19, in one exemplary embodiment of the present invention, extends beyond the corresponding edges of planner pages 14 of planner 10. Stated another way, when planner 10 is closed, planner pages 14 will be completely covered by planner cover 11. Planner cover 11 and planner backing 12** can be, e.g., plastic, linen, vinyl, cardboard, or leather.

Planner 10 also includes planner mount 15 (FIG. 3) and planner binding 13, which is positioned adjacent planner cover left edge 19 and interconnects planner cover 11, planner pages 14, and planner backing 12. In another embodiment of the present invention, planner binding 13 is positioned adjacent planner cover top edge 16. Planner binding 13 can be, e.g., wire coil binding, plastic coil binding, three-ring binding, sewn binding, adhesive binding, strip binding, or thermal binding. Standards 20 can be various sizes. For example, standards 20 may be sized whereby any two standards may be positioned along cover top edge 16.

Planner 10 may contain either a single academic standard, e.g., standard 20*a*, or a plurality of academic standards, e.g., standards 20*a*, 20*b*, 20*c*. With the exception of any edge of planner cover 11 containing planner binding 13, standards 20*a*, 20*b*, 20*c* may be attached about the perimeter of planner cover 11, about the perimeter of planner backing 12, or to any of planner pages 14.

Referring to FIG. 2, standards 20*a*, 20*b*, 20*c* include standard pages 24 positioned intermediate standard cover 21 and standard backing 22. The perimeter of standard cover 21, defined by standard cover top edge 26, standard cover bottom edge 27, standard cover right edge 28, and standard cover left edge 29, in one exemplary embodiment of the present invention, extends beyond the corresponding edges of standard pages 24 of standards 20*a*, 20*b*, 20*c*. Stated another way, when standards 20*a*, 20*b*, 20*c* are closed, standard pages 24 will be completely covered by standard cover 21. Standard cover 21 and standard backing 22 can be, e.g., plastic, linen, vinyl, cardboard, or leather.

Standards 20*a*, 20*b*, 20*c* also include standard mount 25 and standard binding 23, which is positioned adjacent standard cover top edge 26. Standard binding 23 interconnects standard cover 21, standard pages 24, and standard backing 22. In another embodiment, standard binding 23 is positioned adjacent standard cover left edge 29. Standard binding 23 can be, e.g., wire coil binding, plastic coil binding, three-ring binding, sewn binding, adhesive binding, strip binding, or thermal binding.

Referring to FIG. 2, open planner 10 is shown including both open standards 20*b* and 20*c* and closed standard 20*a* attached thereto in an arrangement allowing the concurrent viewing of any of a plurality of standard pages 24 of academic standards 20*b*, 20*c* while viewing or recording information to any of a plurality of planner pages 14 of academic planner 10. Standard backing 22 of standards 20*a*, 20*b*, 20*c* are, in this exemplary embodiment of the present invention, attached to the inside of planner cover 11 and positioned beneath planner pages 14. Standard cover 21 of closed standard 20*a* overlays planner pages 14 when planner 10 is open. Standard pages 24 also overlap planner pages 14 when planner 10 is open.

Planner pages 14 are formatted to contain information pertinent to an educator when creating a lesson plan. In one embodiment, planner page columns 30*a–e* can be utilized for recording information relating to the five days of the school week. Similarly, planner page rows 60*a–f* can be utilized to record information relating to different academic subjects that an educator may teach, e.g., math, science, English, social studies, health and fine arts. Standards 20*a*, 20*b*, 20*c* include a plurality of standard pages 24 that contain information which is concurrently viewable to the user of the present invention as she views or records information to any of a plurality of planner pages 14 of planner 10.

Referring now to FIG. 3, planner 10 is illustrated with standards 20*a*, 20*b* attached thereto, and standard 20*c*. Planner cover 11 of planner 10 is shown in an open position and planner mount 15 is shown attached to the inside of planner cover 11.

Planner mount 15 allows standard 20*c* to be attached to and detached from the inside of planner cover 11. In one embodiment of the present invention, planner mount 15 is a hook and loop type fastener. In alternate embodiments of the present invention, planner mount 15 can be, e.g., a magnetic fastener, a magnetic snap, a magnetic button, or a snap button. In one embodiment of the present invention, planner mount 15 is attached to the inside of planner cover 11 adjacent to planner cover top edge 16. In alternative embodiments of the present invention, planner mount 15 can be attached to, e.g., the inside of planner cover 11 adjacent to planner cover bottom edge 17, or the inside of planner cover 11 adjacent to planner cover left edge 18.

Referring to FIG. 3, standard mount 25 is attached to the backside of standard backing 22. Standard mount 25 allows standard 20*c* to be attached to and detached from the inside of planner cover 11. The perimeter of the backside of standard backing 22 is defined by standard backing top edge 50, standard backing bottom edge 51, standard backing right edge 52, and standard backing left edge 53. Standard mount as is contained by the perimeter of the backside of standard backing 22.

In one embodiment of the present invention, standard mount 25 is a mating hook and loop type fastener. In alternate embodiments of the present invention, standard mount 25 can be, e.g., a magnetic fastener, a magnetic snap, a magnetic button, or a snap button. In one embodiment of the present invention, standard mount 25 is attached to the backside of standard backing 22 adjacent to standard backing bottom edge 51. In alternate embodiments of the present invention, standard mount 25 can be attached to, e.g., the backside of standard backing 22 adjacent to standard backing top edge 50, the backside of standard backing 22 intermediate to backing top edge 50 and standard backing bottom edge 51, the backside of standard backing 22 adjacent to standard backing right edge 52, or the backside of standard backing 22 adjacent to standard backing left edge 53. Importantly, standard mount 25 and planner mount 15 comprise cooperating fasteners.

Figure 4:
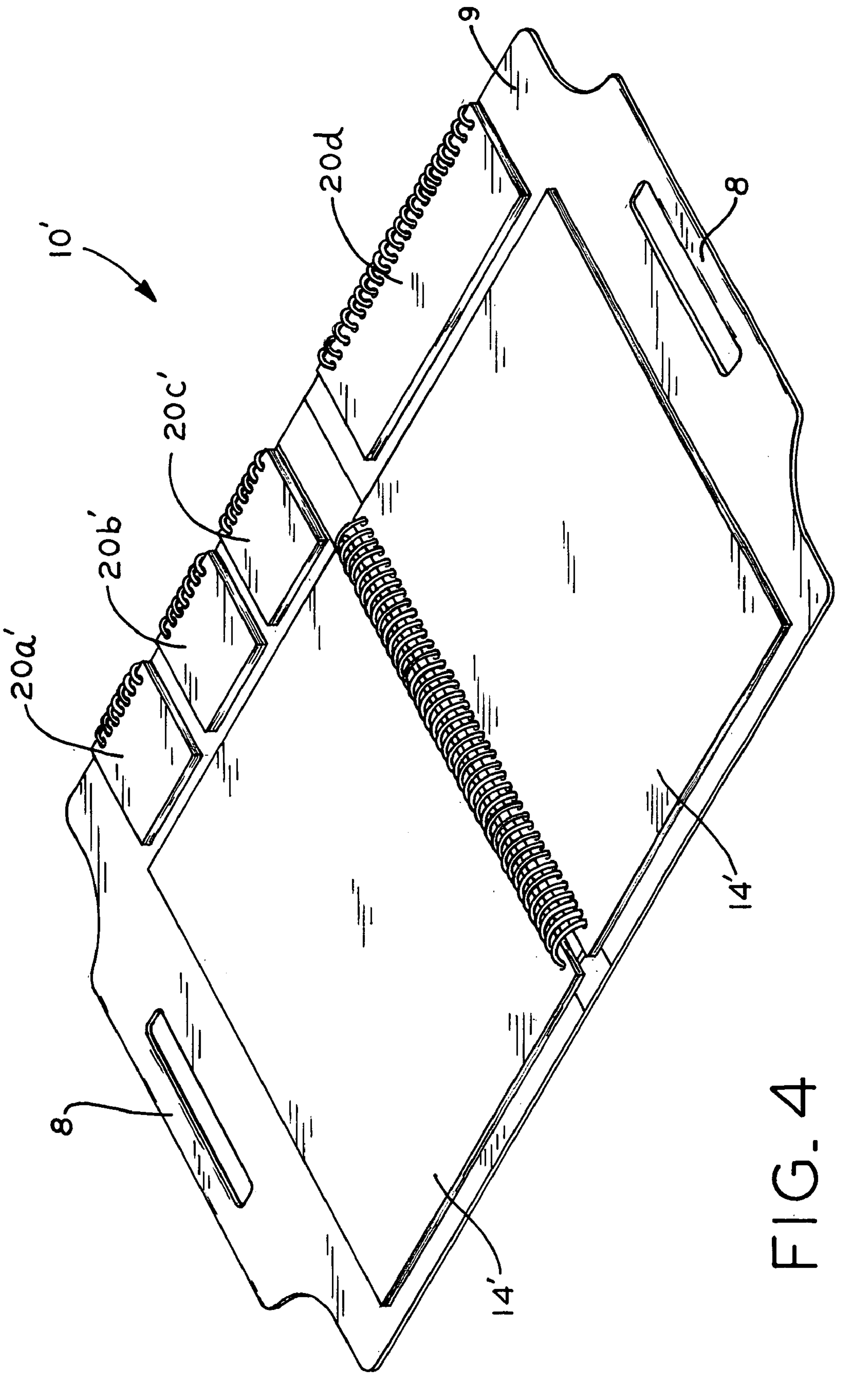
FIG. 4 is a perspective view of an alternative embodiment academic planner of the present invention having secondary media containing academic standards attached thereto.

FIG. 4 illustrates alternative embodiment planner 10' including academic standards 20*a*', 20*b*', 20*c*', and 20*d*. Alternative embodiment planner 10' is substantially similar to planner 10 discussed above. For example, standards 20*a*', 20*b*', and 20*c* are secured to planner body 9 of planner 10' in the same way that standards 20*a*, 20*b*, and 20*c* are attached to planner 10 as discussed above. Alternative embodiment planner 10' differs from planner 10 discussed above in that it includes planner body 9 of sufficient size to accommodate planner pages 14' as well as standards 20*a*', 20*b*', 20*c*', and 20*d* within the perimeter of planner body 9. In this embodiment, academic standards secured to planner body 9 do not extend outwardly from the perimeter of planner body 9. Furthermore, planner body 9 includes integral handles 8 useful for carrying academic planner 10'.

Figure 5:
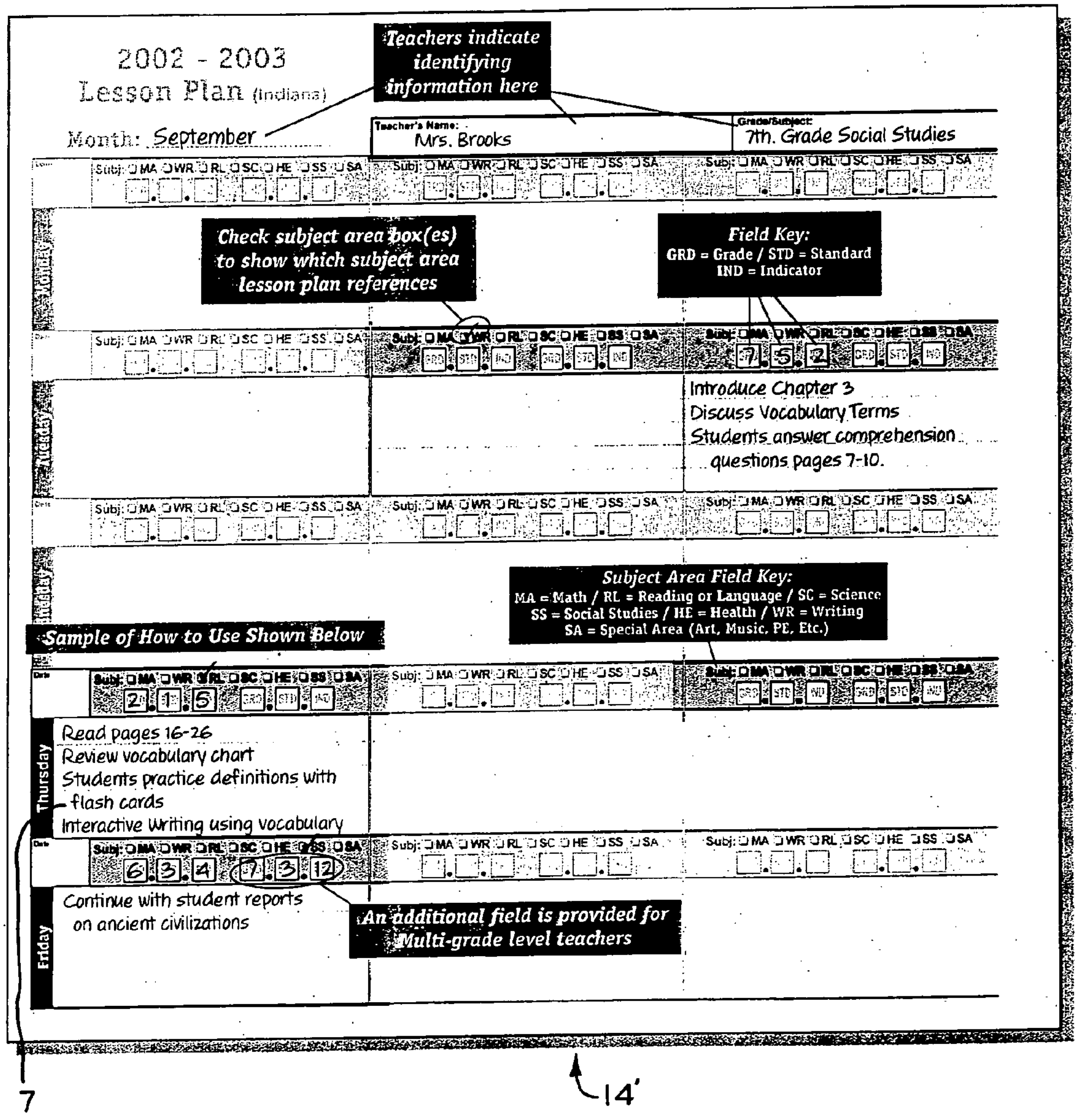
FIG. 5 is a schematic diagram of an academic planner page in accordance with the present invention.

FIG. 5 illustrates alternative embodiment planner page 14'. In this alternative embodiment, each planner page 14' includes locations for teachers to indicate identifying information such as month, day of month, teachers name, grade, and subject taught. As illustrated in FIG. 5, each day includes multiple boxes 7 in which instructors can record daily lesson plans for a particular class and day. As illustrated in FIG. 5, each box 7 includes a subject area field having check boxes for multiple subjects so that the subject taught can be easily indicated in the particular day's lesson plan. Each box 7 further includes a pair of field keys for easily recording the number of the particular academic standard taught. In alternative embodiments, additional field keys may be provided with each box 7. Furthermore, field keys associated with box 7 will be customized to a particular state's academic standards.

The present invention allows an educator to create a lesson plan which includes the academic standards necessary to instruct students to the level of proficiency which the educator's school will be held responsible. For example, referring to FIG. 3, when an educator prepares a lesson plan for instructing students in mathematics, she will open both planner 10 and the academic standard for mathematics. The educator will then decide for which day of the week she wishes to prepare a lesson plan. To teach his/her students a particular topic of mathematics, the educator references the appropriate math academic standard(s) and records this information in his/her lesson plan while concurrently viewing the appropriate academic standard. By reading and reviewing academic standards 20*a*, 20*b*, 20*c* while concurrently recording a lesson plan(s) in planner 10, an educator can be confident in creating appropriate lesson plans in view of the state academic standards including in his/her plan(s) the academic material in which the educator's students must be proficient. Advantageously, the academic planner of the present invention allows planner pages to be viewable together with pages of academic standards contained in academic standard booklets without requiring movement or other manipulation of pages of either the academic planner or the academic standard to allow for concurrent viewing and recording of information in both.

While the invention has been illustrated and described in detail in the drawings and foregoing description, the same is to be considered as illustrative and not restrictive in character. It should be understood that only exemplary embodiments have been shown and described and that all changes and modifications that come within the spirit of the invention are desired to be protected.

What is claimed is:

1. A method of facilitating an instructor's compliance with state academic standards, comprising:

providing an academic planner, comprising:

a planner body; and a plurality of planner pages attached to said planner body;

providing a plurality of academic standard booklets, each containing a plurality of pages of state academic standards for a particular grade and subject, said academic standard booklets selectively attachable to said planner body, said pages of state academic standards viewable together with at least one of said plurality of planner pages when each said academic standard booklet is attached to said planner body;

choosing at least one of said academic standard booklets;

attaching the chosen academic standard booklets to the planner body; and viewing the academic standard booklets while recording a lesson plan in a planner page.

2. The method of claim 1, further comprising:

recording information identifying a state academic standard corresponding to said lesson plan.

3. A method of preparing a lesson plan, said method comprising the steps of:

providing an academic planner, said academic planner including:

a primary medium for recording and displaying an amount of primary information; and at least one secondary medium for displaying an amount of secondary information, said secondary medium selectively attachable to said primary medium whereby said amount of secondary information is concurrently viewable together with said primary medium when said secondary medium is attached to said primary medium;

attaching said secondary medium to said primary medium; and recording a lesson plan in said primary medium while concurrently referencing said amount of secondary information contained in said secondary medium, said lesson plan comprising said amount of primary information, wherein said amount of secondary information comprises state academic standards.

4. The method of claim 3, further comprising:

recording information identifying a state academic standard corresponding to said lesson plan.

5. The method of claim 3, wherein said primary medium comprises:

a planner body; and a plurality of planner pages attached to said planner body.

6. A method of preparing a lesson plan, said method comprising the steps of:

providing an academic planner, said academic planner including:

a primary medium for recording and displaying an amount of primary information; and at least one secondary medium for displaying an amount of secondary information, said secondary medium selectively attachable to said primary medium whereby said amount of secondary information is concurrently viewable together with said primary medium when said secondary medium is attached to said primary medium;

attaching said secondary medium to said primary medium; and recording a lesson plan in said primary medium while concurrently referencing said amount of secondary information contained in said secondary medium, said lesson plan comprising said amount of primary information, wherein said at least one secondary medium comprises at least one academic standard booklet containing a plurality of pages of state academic standards for a particular grade and subject, said academic standard booklet selectively attachable to said primary medium, said pages of said state academic standards viewable together with said primary medium when each said academic standard booklet is attached to said primary medium.

* * * * *